A. L. CUSHMAN.
DYNAMO ELECTRIC MACHINE.
APPLICATION FILED MAY 27, 1907.
938,558.
Patented Nov. 2, 1909.
4 SHEETS—SHEET 1.
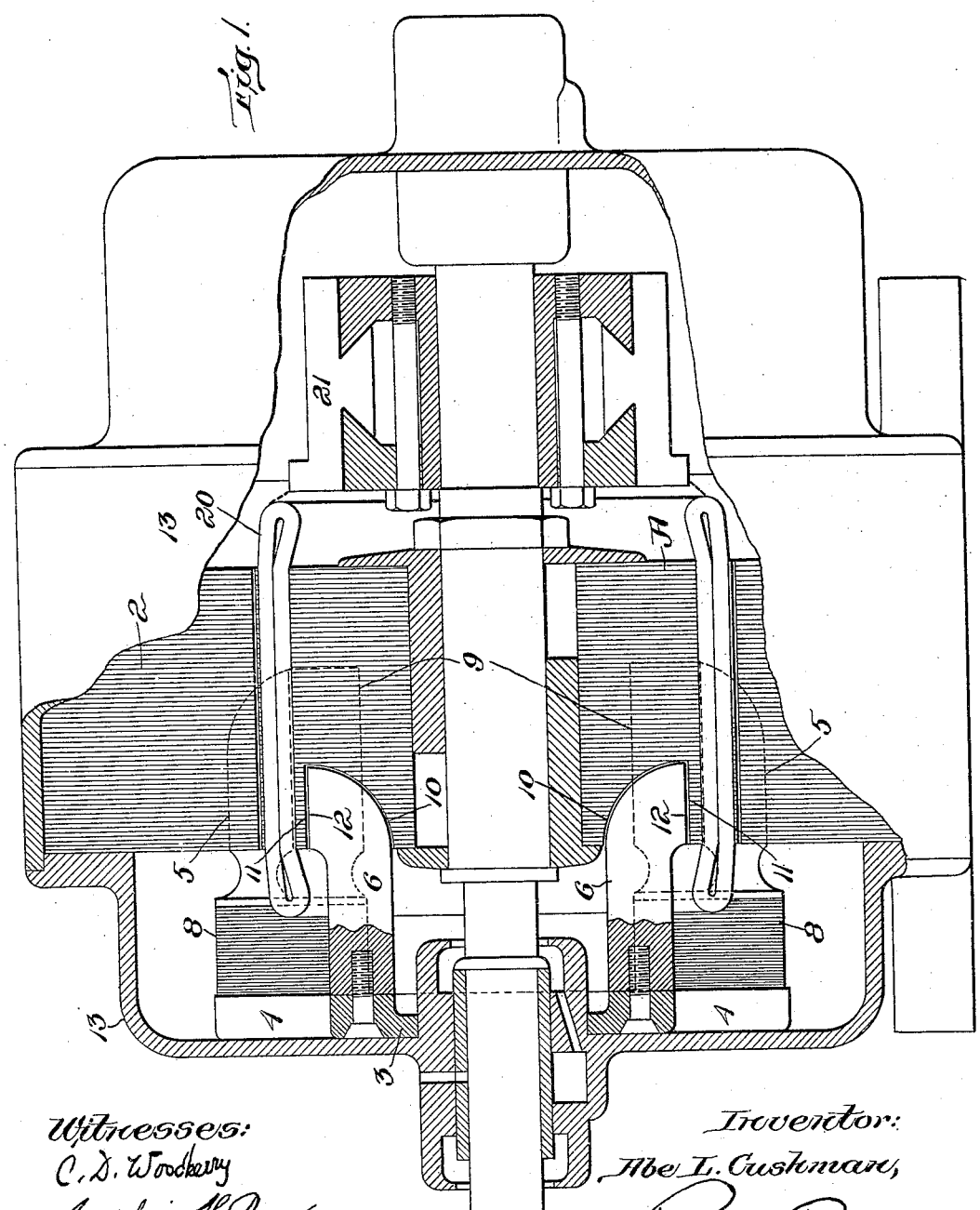
Witnesses:
C. D. Woodbury
Josephine H. Ryan
Inventor:
Abe L. Cushman,
by Robert Cushman,
Atty.

A. L. CUSHMAN.
DYNAMO ELECTRIC MACHINE.
APPLICATION FILED MAY 27, 1907.
938,558.
Patented Nov. 2, 1909.
4 SHEETS—SHEET 2.
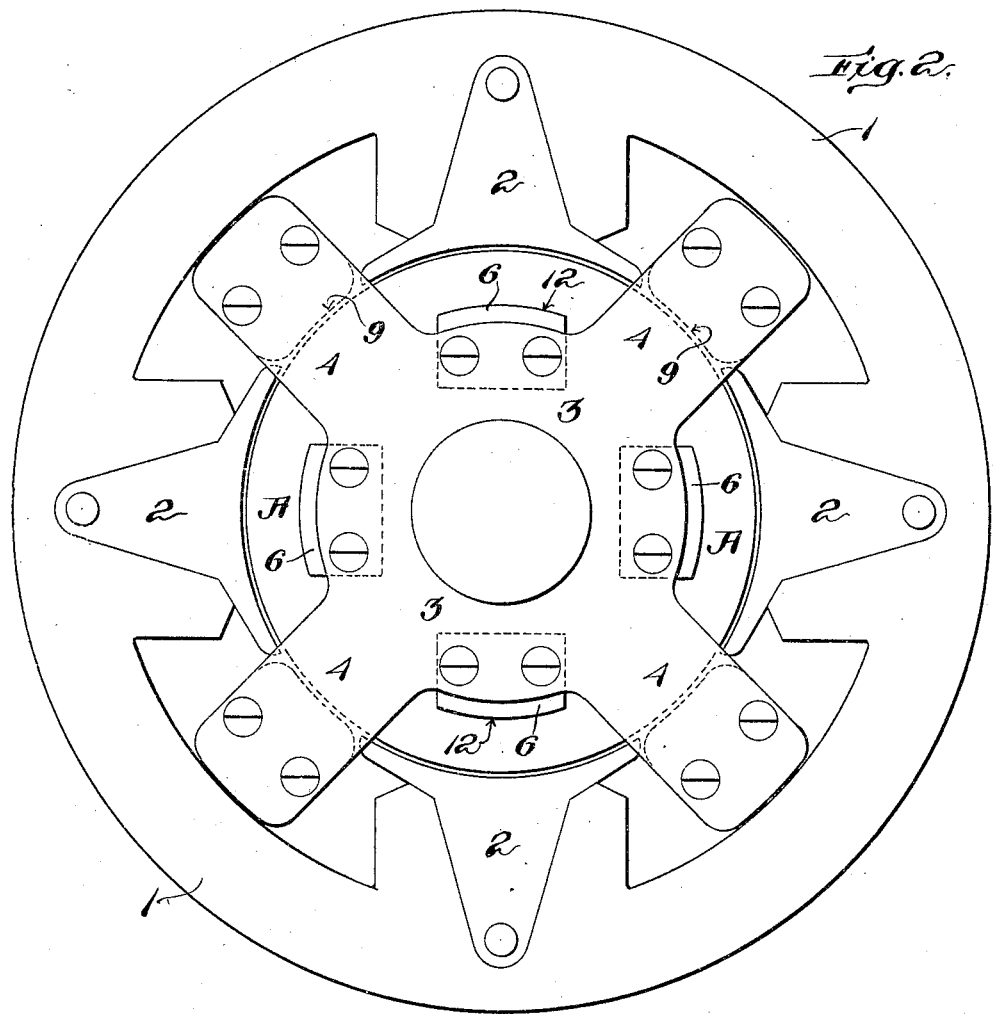
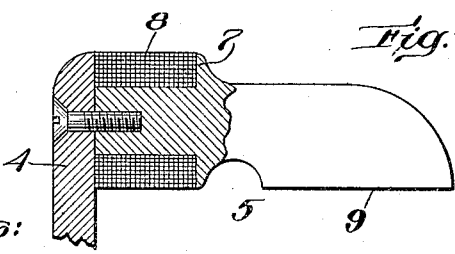

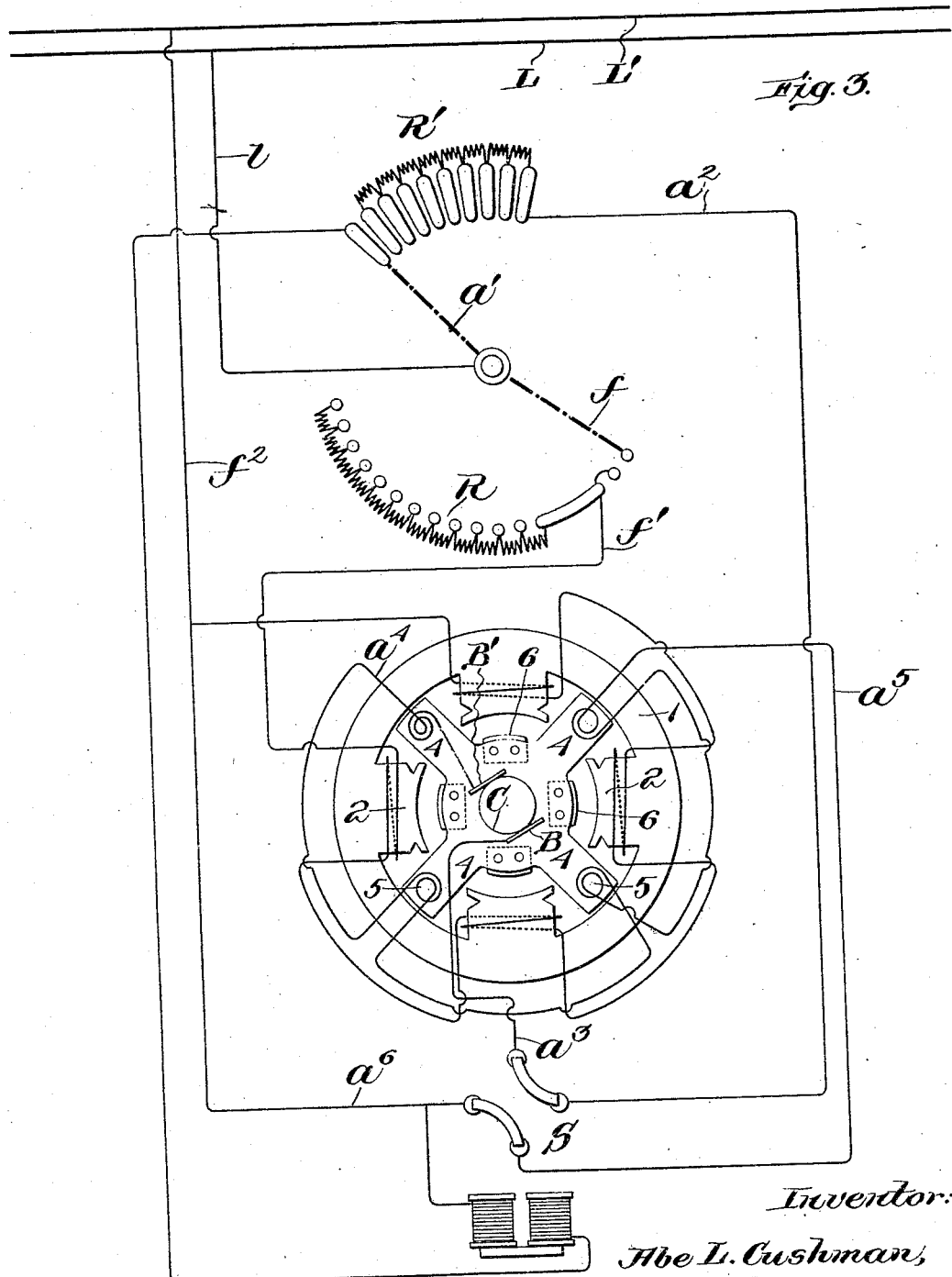

A. L. CUSHMAN.
DYNAMO ELECTRIC MACHINE.
APPLICATION FILED MAY 27, 1907.

938,558.

Patented Nov. 2, 1909.
4 SHEETS—SHEET 4.

Witnesses:

Inventor:
Abe L. Cushman,
by Robert Cushman,
Atty.

UNITED STATES PATENT OFFICE.

ABE LINCOLN CUSHMAN, OF CONCORD, NEW HAMPSHIRE.

DYNAMO-ELECTRIC MACHINE.

938,558.    Specification of Letters Patent.    Patented Nov. 2, 1909.

Application filed May 27, 1907. Serial No. 375,916.

*To all whom it may concern:*

Be it known that I, ABE LINCOLN CUSHMAN, a citizen of the United States, and resident of Concord, in the county of Merrimack and State of New Hampshire, have invented new and useful Improvements in Dynamo-Electric Machines, of which the following is a specification.

My invention relates to dynamo electric machines, and particularly to the construction of variable speed, shunt wound, direct current motors, in which the speed of the armature may be varied by varying the ampere turns in the field magnets of the motor.

One object of my invention is to provide an electro-mechanical arrangement by which the crowding over or distortion of the lines of field force, which varies with variations in rotative speed of the armature or with variations of load under constant speed, may be effectively offset or compensated for by opposed distortions variably maintained by interpolar windings which affect the field poles variably as the current in the field magnetic circuit varies, thus preventing injurious sparking between the commutator and the commutating brushes.

A distinguishing feature of my invention is the use of interpolar magnets, which may also be termed commutating magnets, and which are in magnetic circuit independent of the field magnetic circuit.

Other features will hereinafter be pointed out.

Figure 6:
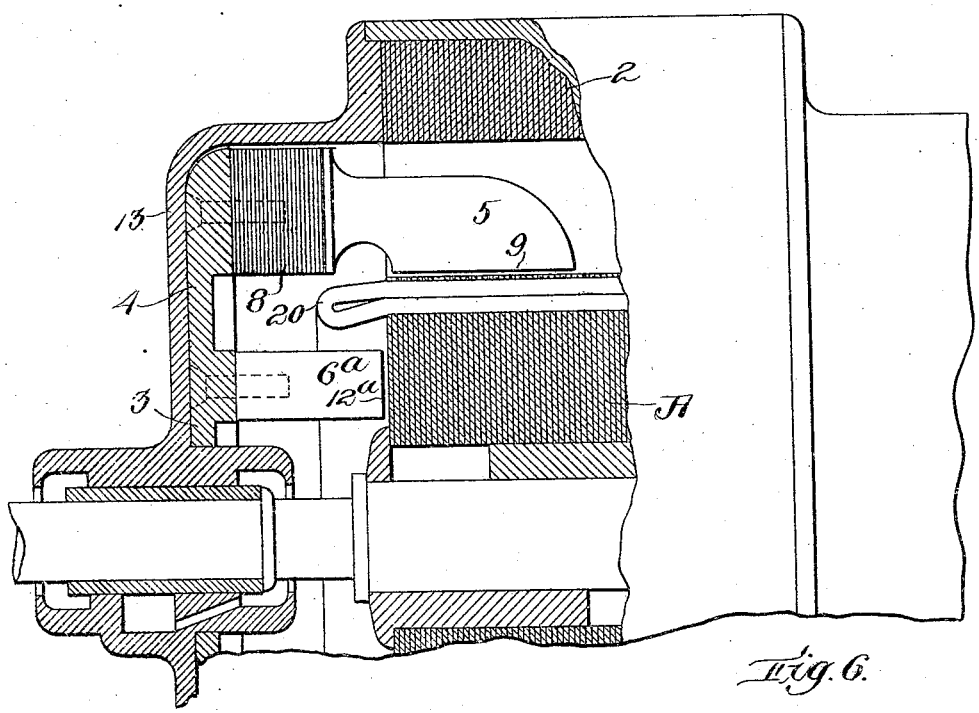
Figure 5:
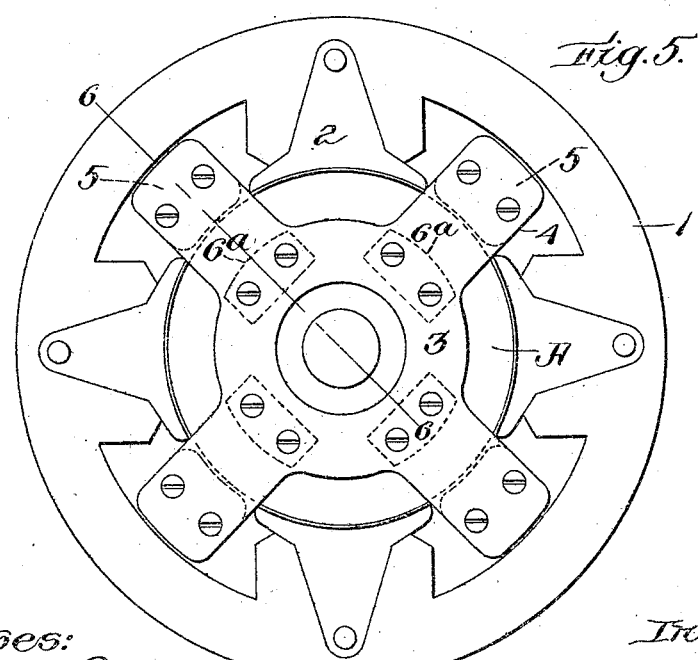

In the accompanying drawings, which illustrate an embodiment of my invention,— Figure 1 is a side view of a motor containing my invention, part of the motor casing being broken away, showing the field magnet, commutating magnet, commutator and armature, partly in vertical longitudinal section, and partly in elevation; Fig. 2 is an end elevation of the field magnet, commutating magnet and armature shown in Fig. 1; Fig. 3 is a diagrammatic view of a motor containing my invention, showing the wiring; Fig. 4 is a detail showing in side elevation one of the pole pieces of the commutating magnet. Fig. 5 is an end elevation of a field magnet, armature and a modified form of commutating magnet; and Fig. 6 is a fragmentary sectional view on line 6—6 of Fig. 5.

The field magnet frame 1 is, according to approved practice, built up by assembling a suitable number of laminations of magnetic material, the field pole pieces 2 being similarly laminated and composed of internal radial projections from the ring portion or yoke of the field frame. These pole pieces are also preferably enlarged or extended at their inner ends as indicated in the drawings to provide flaring pole tips which prevent the abrupt entrance of the armature windings into the field.

L and L' are the incoming and outgoing main lines respectively.

The windings of the field poles 2 are in shunt with the armature and in series with each other. The circuit of the pole windings is as follows: from main line L, by wire $l$, arm $f$ of variable resistance R, wire $f'$ to the successive field poles, and thence by wire $f^2$ to the other main line L'. These field windings as already stated, are in shunt with the armature A.

The commutating magnet, in the preferred form, as illustrated in the drawings, consists of a frame made up of an annulus 3 surrounding the armature shaft, the arms 4 extending radially from the annulus, the interpoles 5 secured to said frames alternating with and projecting between the field pole pieces about the periphery of the armature A, and the pole pieces 6 also secured to the commutating frame or yoke and projecting toward the end of the armature A.

The windings of the commutating poles are in series with the armature and with each other, and the circuit is as follows: from the main line L, by wire $l$, arm $a'$ of variable resistance R', wire $a^2$, one segment of reversing switch S, wire $a^3$, commutating brush B, commutator rings C, the other commutating brush B', wire $a^4$ to the successive commutating poles 5, wire $a^5$, the other segment of reversing switch S, wire $a^6$, and thence by wire $f^2$ to the outgoing main line L'. Thus the series of field windings and the series of inter polar or commutating windings are mutually independent magnetic circuits.

The pole pieces 5 of the commutating magnet are secured by screws to the arms 4 of the frame, as best shown in Fig. 4, and are provided with shoulders 7 for retaining the polar windings 8 in place. Each pole piece 5 is provided with a flattened or slightly curved surface 9, which faces and conforms with the periphery of the armature A in close proximity thereto and between the field poles 2.

The pole pieces 6 are screwed to the same frame, and therefore to the same magnetic yoke, with the commutating pole pieces 5. These pole pieces, as shown in the drawings, are placed upon the ring 3 between the arms 4 and in radial alinement with the several field poles 2. Such location is, however, not essential, and they may be placed in radial alinement with the commutating poles 5 as shown at 6ª in Figs. 5 and 6 or elsewhere upon the frame so long as they project toward the end of the armature in such position as to embrace between them and the poles 5 the windings of the armature. In the preferred form the pole pieces 6 project into the end of the armature and beyond the extremity thereof, and to this end I provide an annular recess 10 in the end of the armature frame, the outer wall 11 of which is parallel with the periphery of the armature. The ends of pole pieces 6 are outwardly turned at 12 to face the surface 11. The object of making the surfaces 11 and 12 parallel with the periphery of the armature is to prevent so far as possible end thrust of the armature when the magnets are energized. It will be understood, however, that this arrangement is not essential apart from its effect upon the end thrust, and that the angular relation of the surfaces 11 and 12 with the periphery of the armature may be varied through any degree as desired from parallelism to 90°. Thus in Fig. 6 is shown a modified form of interior pole piece, 6ª, having its end 12ª at right angles with the periphery of the armature instead of parallel therewith. While I believe the best results will be obtained with the use of the form of pole pieces 6 as shown, I wish it understood that the annular recess 10 may be dispensed with as shown in Figs. 5 and 6, and the pole pieces shortened and simply projecting toward the end of the armature as shown at 6ª. In either case it will be seen that the pole pieces 6 will be on the inner side of the armature windings and that the pole pieces 5 and 6 or 6ª respectively are arranged in pairs and embrace between them the armature windings which will be cut by the lines of force between said pole pieces. Each pole piece 5 and its appropriate pole piece 6 or 6ª as the case may be form, in effect, a horseshoe magnet, the yoke of which is the frame, the horseshoe extending around the end of the armature windings, and one pole facing the periphery and the other pole the inner side of the armature windings.

The commutating magnet frame is secured to and supported by the end of the motor casing 13 in any suitable way.

The armature windings are illustrated at 20 Fig. 1). They are arranged in slots on the periphery of the armature core as usual and project beyond the ends thereof, as shown, into the space between the pole pieces 5 and 6 at the end adjacent to the commutating magnet. The commutator 21 is of ordinary form and is connected in the ordinary way with the armature windings.

The armature resistances and controller R' and a', the field resistances and controller R and f and the reversing switch S may all be of the kind shown in my U. S. Patent No. 828,388, dated August 14, 1906, and for further description thereof reference is made to that patent.

I claim:

1. In a dynamo electric machine, an armature and commutator, a field magnet having a series of poles carrying field windings in shunt, a commutating magnet having a plurality of poles carrying windings in magnetic circuit independent of the field circuit and arranged about the periphery of the armature, and also a plurality of poles upon the same magnetic yoke with such peripheral poles and arranged interiorly of the armature windings, whereby the lines of force between them and the peripheral poles will pass through the armature windings between the interior and exterior thereof.

2. In a dynamo electric machine, an armature and commutator, a field magnet having a series of poles carrying field windings in shunt, a plurality of commutating pole pieces carrying windings in magnetic circuit independent of the field circuit, said pole pieces arranged in pairs connected by a magnetic yoke, one member of each pair being within and one member being without the plane of the periphery of the armature.

3. In a dynamo electric machine, an armature and commutator, a field magnet having a series of poles carrying field windings in shunt, a plurality of commutating pole pieces carrying windings in magnetic circuit independent of the field circuit, said pole pieces arranged in pairs and connected by a magnetic yoke, one pole of each pair facing the periphery of the armature, and the other pole projecting toward the end of the armature.

4. In a dynamo electric machine, an armature and commutator, a field magnet having a series of poles carrying field windings in shunt, a plurality of commutating poles carrying windings in magnetic circuit independent of the field circuit and arranged in pairs, the poles of each pair connected by a magnetic yoke, one pole of each pair projecting between the field poles and facing the periphery of the armature, and the other pole extending toward the end of the armature.

5. In a dynamo electric machine, an armature and commutator, a field magnet having a series of poles carrying field windings in shunt, a plurality of communicating poles carrying windings in magnetic circuit independent of the field circuit and arranged in pairs, the poles of each pair connected by a magnetic yoke, the armature being provided in its end with an annular recess surrounding the armature shaft as a center, one pole of each pair of commutating poles facing the periphery of the armature, and the other pole extending into said annular recess in the end of the armature.

6. In a dynamo electric machine, an armature and commutator, a field magnet having a series of poles carrying field windings in shunt, a plurality of commutating poles carrying windings in magnetic circuit independent of the field circuit and arranged in pairs, the poles of each pair connected by a magnetic yoke, one pole of each pair projecting between the field poles and facing the periphery of the armature, and the other pole extending toward the end of the armature and in radial alinement with one of the field poles.

7. In a dynamo electric machine, an armature and commutator, a field magnet having a series of poles carrying field windings in shunt, a plurality of commutating poles carrying windings in magnetic circuit independent of the field circuit and arranged in pairs, the poles of each pair connected by a magnetic yoke, the armature being provided in its end with an annular recess having a cylindrical outer wall or surface, one pole of each pair of commutating poles facing the periphery of the armature and the other pole extending into said recess and facing said cylindrical surface.

8. In a dynamo electric machine, the armature, commutator, motor casing and field frame having a series of poles thereon, and a commutating frame mounted on the side of the field frame, magnetically separate from the field frame, supported by the motor casing, and provided with poles in magnetic circuit independent of the field circuit and arranged in pairs, one pole of each pair projecting between the field poles and facing the periphery of the armature, and the other facing the end of the armature, whereby the armature windings will be embraced between the ends of said pairs of commutating poles.

Signed by me at Concord, New Hampshire, this 20th day of May, 1907.

ABE LINCOLN CUSHMAN.

Witnesses:
VERA I. CATON,
ROBERT CUSHMAN.